United States Patent [19]

Girrbach et al.

[11] Patent Number: 5,102,638

[45] Date of Patent: Apr. 7, 1992

[54] PROCESS FOR THE SELECTIVE ABSORPTION OF CHLORINE FROM CO$_2$-CONTAINING OFF-GASES

[75] Inventors: Ulrich Girrbach, Frankfurt am Main; Richard Grimm, Königstein; Edgar Härtl, Langen; Egon Malow, Hochheim, all of Fed. Rep. of Germany

[73] Assignee: Hoechst Aktiengesellschaft, Frankfurt am Main, Fed. Rep. of Germany

[21] Appl. No.: 546,244

[22] Filed: Jun. 29, 1990

[30] Foreign Application Priority Data

Jul. 1, 1989 [DE] Fed. Rep. of Germany ....... 3921714

[51] Int. Cl.$^5$ ................... B01D 53/34; C01B 7/01
[52] U.S. Cl. ......................... 423/241; 55/71; 423/221; 423/232
[58] Field of Search ............. 423/241, 220, 221, 232; 55/71

[56] References Cited

U.S. PATENT DOCUMENTS

| | | | |
|---|---|---|---|
| 3,984,523 | 10/1976 | Schäfer et al. | 423/240 |
| 4,681,045 | 7/1987 | Dvirka et al. | 423/232 |

FOREIGN PATENT DOCUMENTS

| | | | |
|---|---|---|---|
| 1074201 | 1/1960 | Fed. Rep. of Germany | 423/232 |
| 2413358 | 9/1975 | Fed. Rep. of Germany . | |
| 2849498 | 5/1980 | Fed. Rep. of Germany . | |
| 49-62378 | 10/1972 | Japan | 55/71 |

*Primary Examiner*—John Niebling
*Assistant Examiner*—Brian M. Bolam

[57] ABSTRACT

The invention provides a process for the selective absorption of chlorine from CO$_2$-containing off-gases, which comprises washing the off-gases with an aqueous solution which contains 0.1–10% by weight of NaHCO$_3$ and 0.01–5% by weight of NaHSO$_3$.

7 Claims, No Drawings

PROCESS FOR THE SELECTIVE ABSORPTION OF CHLORINE FROM CO₂-CONTAINING OFF-GASES

The combustion of chlorinated hydrocarbons gives according to the DEACON equilibrium, besides hydrogen chloride and $CO_2$, also elemental chlorine. This chlorine is not allowed to be discharged into the environment and must therefore be removed from the off-gas to the greatest possible extent. In the Federal Republic of Germany, the chlorine concentration must be below 5 mg/m³.

The absorption of chlorine from gas streams has hitherto generally been carried out using sodium hydroxide solution with the formation of sodium hypochlorite:

$$Cl_2 + 2NaOH \rightarrow NaCl + NaOCl + H_2O$$

In the case of gas streams which besides chlorine contain only inert gases, an industrially useful product (NaOCl solution) is obtained from the absorbent. However, if the off-gas which is to be absorbed contains besides $Cl_2$ other alkali-soluble gases, the identical procedure gives a solution of several salts which is virtually unusable. For example, $CO_2$ is also absorbed by sodium hydroxide solution with the formation of $NaHCO_3$:

$$NaOH + CO_2 \rightarrow NaHCO_3$$

According to the prior art, NaOCl is removed from these mixtures of salts by adding $Na_2SO_2$.

The minimization of the troublesome simultaneous absorption of $CO_2$ has already received much attention, so that techniques are already known for specific applications.

A process described in DE-A-2,849,498 employs two absorption cycles running on NaOH for absorbing $Cl_2$ to give NaCl and NaOCl. A portion of the resulting NaOCl is continually discharged and decomposed using $NaHSO_3$. However, the off-gas purified by this process still contains about 10 ppm, i.e. about 30 mg/m³, of chlorine.

The multistage countercurrent absorption of chlorine using sodium hydroxide solution which is described in U.S. Pat. No. 3,984,523 is suitable only for gas streams which firstly are highly laden with chlorine and secondly contain $CO_2$ in a concentration similar to that of $Cl_2$. However, owing to the high absorption of $CO_2$ in alkali, this process is not suitable for use with a 100-1000-fold excess of $CO_2$ relative to $Cl_2$ in the off-gas. If the off-gas is highly laden with chlorine, the $CO_2$ which has been absorbed in the last stage is driven off again in the first stage by chlorine, a procedure which is not possible at low chlorine loadings. Furthermore, U.S. Pat. No. 3,984,523 states that it is not possible to achieve a chlorine content in the off-gas lower than 5 mg/m³ of $Cl_2$ by washing with $NaHCO_3$ solution.

Surprisingly, it has now been found that using a $NaHCO_3$ solution to which small amounts of $NaHSO_3$ are added, it is possible to remove virtually all the $Cl_2$, even when the washing solution is repeatedly reused, without $CO_2$ being absorbed. The concentrations of $Cl_2$ achieved in the purified gas were below the analytical limit of detection.

The present invention accordingly provides a process for the selective absorption of chlorine from $CO_2$-containing off-gas, which comprises washing the off-gas with an aqueous solution which contains 0.1–10% by weight of $NaHCO_3$ and 0.01–5% by weight of $NaHSO_3$. The aqueous solution with which the off-gas is washed preferably contains 0.5–7% by weight of $NaHCO_3$ and 0.05–1% by weight of $NaHSO_3$, in particular 1–5% by weight of $NaHCO_3$ and 0.1–0.5% by weight of $NaHSO_3$.

Instead of $NaHCO_3$, it is also possible to add NaOH to the washing solution since this reacts immediately with the $CO_2$ of the off-gas to give $NaHCO_3$. If the off-gas contains $SO_2$, it is similarly possible to add NaOH to the washing solution instead of $NaHSO_3$, since NaOH reacts with the $SO_2$ to give $NaHSO_3$.

The process according to the invention allows high salt concentrations to be maintained in the circulated washing solution. Consequently, spent washing solution needs to be replaced by fresh washing solution at only a very low rate.

The absorption of chlorine from $CO_2$-containing off-gases (flue gases) is carried out continuously in a single stage or multistage absorption plant (column, jet scrubber, etc.).

The process according to the invention can be operated so that the amount of fresh absorption solution added is sufficient to hold the pH approximately constant.

The process according to the invention is suitable in particular for $CO_2$-rich gases, e.g. gases in which the $CO_2:Cl_2$ ratio, by volume, ranges from about 100 to $10^6$. Thus, this invention is suitable even for those gases whose $CO_2$ content is $10^4$ to $10^6$ times higher than the $Cl_2$ content.

The invention is explained in the examples which follow.

EXAMPLE 1

A jet scrubber was used to purify 1.8 m³/h of an off-gas which contained 70 mg/m³ of $Cl_2$, 20% by volume of $CO_2$ and 4% of $O_2$, the remainder being $N_2$.

In the steady state, the washing solution contained, besides water:

| | |
|---|---|
| 1. $NaHCO_3$ | 4% by weight |
| 2. $NaHSO_3$ | 0.4% by weight |
| 3. $Na_2SO_4$ | 0.3% by weight |
| 4. NaCl | 0.2% by weight |

100 ml of washing solution per hour was withdrawn and replaced by fresh washing solution. Besides water, the fresh washing solution contained:

| | |
|---|---|
| 1. $NaHCO_3$ | 4.3% by weight |
| 2. $NaHSO_3$ | 0.6% by weight |

The hold-up in the jet scrubber was about 8 l, and the circulated amount of washing solution was about 35 l/h. This corresponds to a ratio of gas:liquid of about 50:1. The concentration of chlorine in the purified off-gas at the outlet from the scrubber was less than 0.1 mg of $Cl_2$/m³ of gas. The chlorine concentration was determined by the methyl orange method (VDI handbook "Reinhaltung der Luft", Volume 5, Register 9, VDI Guideline 3488, Part I).

EXAMPLE 2

A jet scrubber was used to purify 1.8 m³/h of an off-gas which contained, besides $N_2$, 130 mg/m³ of chlorine, 20% by volume of $CO_2$ and 4% of $O_2$. In the steady state, the washing solution contained, besides water:

| | | |
|---|---|---|
| 1. $NaHCO_3$ | 4% by weight | |
| 2. $NaHSO_3$ | 0.4% by weight | |
| 3. $Na_2SO_4$ | 0.5% by weight | |
| 4. $NaCl$ | 0.4% by weight | |

100 ml of washing solution per hour was withdrawn and replaced by fresh washing solution. Besides water, the fresh washing solution contained:

| | | |
|---|---|---|
| 1. $NaHCO_3$ | 5% by weight | |
| 2. $NaHSO_3$ | 0.8% by weight | |

In other respects, the procedure of Example 1 was followed.

The concentration of chlorine in the purified off-gas at the outlet from the scrubber was less than 0.1 mg of $Cl_2/m^3$ of gas.

We claim:

1. A process for the selective absorption of chlorine from $CO_2$-containing off-gas, which comprises treating an off-gas wherein the amount of chlorine in the off-gas exceeds 5 mg per $m^3$ of off-gas but the $CO_2:Cl_2$ ratio, by volume, ranges in the off-gas from about 100 to $10^6$, wherein the treatment comprises:

washing said off-gas in a single-stage absorption zone with a circulating, repeatedly re-used, aqueous washing solution, which solution contains 0.1–10% by weight of $NaHCO_3$ and 0.01–5% by weight of $NaHSO_3$ and in which the amount of $NaHSO_3$ is smaller than the amount of $NaHCO_3$, thereby selectively absorbing chlorine substantially without absorbing carbon dioxide, and obtaining from the single-stage absorption zone an off-gas containing less than 5 mg of chlorine per $m^3$ of gas.

2. The process as claimed in claim 1, wherein the $CO_2$ content is $10^4$ to $10^6$ times higher than the $Cl_2$ content.

3. The process as claimed in claim 1, wherein the off-gas is washed with an aqueous solution which contains 0.5%–7% by weight of $NaHCO_3$ and 0.05%–1% by weight of $NaHSO_3$.

4. The process as claimed in claim 1, wherein the off-gas is washed with an aqueous solution which contains 1%–5% by weight of $NaHCO_3$ and 0.1%–0.5% by weight of $NaHSO_3$.

5. The process as claimed in claim 1, wherein the circulating, repeatedly-reused washing solution contains, besides water, $NaHCO_3$, and $NaHSO_3$, circulating amounts of $Na_2SO_4$ and $NaCl$.

6. The process as claimed in claim 1, wherein said off-gas is a flue gas.

7. The process as claimed in claim 1, wherein fresh absorption solution is added to the circulating, repeatedly-reused washing solution, in an amount sufficient to hold the pH of the circulating, repeatedly-reused washing solution approximately constant.

* * * * *